United States Patent Office 3,234,211
Patented Feb. 8, 1966

3,234,211
TERTIARYAMINOALKOXY ALKYLENE MONO-CYCLIC CARBOCYCLIC ARYLTETRAHYDRO NAPHTHALENES, INDANES, INDENES AND HOMOLOGS THEREOF
Charles Ferdinand Huebner, Chatham, and William Laszlo Bencze, New Providence, N.J., assignors to Ciba Corporation, New York, N.Y., a corporation of Delaware
No Drawing. Filed Oct. 24, 1962, Ser. No. 232,860
13 Claims. (Cl. 260—239)

This is a continuation-in-part application of our application S.N. 160,291 filed December 18, 1960, now abandoned.

The present invention concerns basic ethers. More particularly, it relates to compounds having one of the formulae:

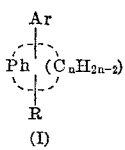

(I)

and

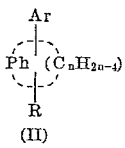

(II)

in which Ph is a 1,2-phenylene radical, Ar is a monocyclic carbocyclic aryl group having as a substituent a tertiary amino-lower alkyl-oxy group, in which tertiary amino is separated from oxy by at least two carbon atoms, R is hydrogen or an aliphatic radical, the group of the formula —$(C_nH_{2n-2})$— stands for an unbranched alkylene radical having from three to five carbon atoms and carrying the groups Ar and R, and the group of the formula —$(C_nH_{2n-4})$— stands for an unbranched alkenylene radical having from three to five carbon atoms and carrying the groups Ar and R, salts, N-oxides, salts of N-oxides or quarternary ammonium compounds thereof, as well as procedure for the preparation of such compounds.

The 1,2-phenylene (o-phenylene) radical is unsubstituted or may be substituted by one or more than one of the same or of different substituents attached to any of the four positions available for substitution. Substituents are, for example, lower alkyl, e.g. methyl, ethyl, n-propyl, isopropyl and the like, hydroxyl, etherified hydroxyl, such as lower alkoxy, e.g. methoxy, ethoxy, n-propyloxy, isopropyloxy, n-butyloxy and the like, lower alkenyloxy, e.g. allyloxy and the like, lower alkylenedioxy, e.g. methylenedioxy and the like, esterified hydroxyl, such as halogeno (representing hydroxyl esterified by a hydrohalic acid), e.g. fluoro, chloro, bromo and the like, nitro, amino, such as N,N-di-lower alkyl-amino, e.g. N,N-dimethylamino, N,N-diethylamino and the like, trifluoromethyl, acyl, such as lower alkanoyl, e.g. acetyl, propionyl, pivaloyl and the like, benzoyl, pyridoyl, e.g. nicotinoyl and the like, or any other suitable substituent. The 1,2-phenylene group Ph in the above formula is primarily 1,2-phenylene, (lower alkyl)-1,2-phenylene, (hydroxy)-1,2-phenylene, (etherified hydroxy)-1,2-phenylene, such as (lower alkoxy)-1,2-phenylene, (lower alkenyloxy)-1,2-phenylene, (lower alkylenedioxy)-1,2-phenylene and the like, (esterified hydroxy)-1,2-phenylene, such as (halogeno)-1,2-phenylene and the like, (nitro)-1,2-phenylene, (amino)-1,2-phenylene, such as (N,N-di-lower alkyl-amino)-1,2-phenylene and the like, (trifluoromethyl)-1,2-phenylene, (acyl)-1,2-phenylene, such as (lower alkanoyl)-1,2-phenylene, (benzoyl)-1,2-phenylene, (pyridoyl)-1,2-phenylene and the like, or any other suitably substituted 1,2-phenylene group.

The groups of the formulae —$(C_nH_{2n-2})$— and —$(C_nH_{2n-4})$— represent an unbranched alkylene radical and an unbranched alkenylene radical, respectively, having from three to five carbon atoms (the letter $n$ in the above groups stands for an integer from three to five); these radicals substitute the two adjacent positions of the 1,2-phenylene radical Ph and carry the groups Ar and R. Thus, an unbranched alkylene radical of the formula —$(C_nH_{2n-2})$— represents 1,3-propylene, 1,4-butylene or 1,5-pentylene, to which are attached the groups Ar and R. The compounds of this invention having such unbranched alkylene radical, are therefore, compounds having the indane, the 1,2,3,4-tetrahydro-naphthalene or the benzosuberane ring system. An unbranched alkenylene radical is 1,3-prop-3-enylene, 1,4-but-1-enylene, 1,4-but-2-enylene, 1,5-pent-1-enylene, 1,5-pent-2-enylene or 1,5-pent-3-enylene, to which are attached the groups Ar and R. The compounds of this invention, having such unbranched alkenylene radical, are, therefore, compounds having the indene, the 3,4-dihydro-naphthalene, the 2,3-dihydro-naphthalene, the benzosuberene ring system and the like.

A tertiary amino-lower alkyl-oxy group, which may substitute any of the positions, preferably the 4-position, available for substitution in the monocyclic carbocyclic aryl group Ar, may be represented by the formula: —O—$(C_mH_{2m})$—Am, in which the portion of the formula —$(C_mH_{2m})$— stands for lower alkylene, having preferably from two to seven carbon atoms (i.e. the letter $m$ is preferably an integer from two to seven, both inclusive), and separates the tertiary amino group Am from the oxygen atom by at least two carbon atoms. The group of the formula —$(C_mH_{2m})$— stands preferably for alkylene having from two to three carbon atoms (i.e. the letter $m$ stands preferably for an integer from two to three) and separates the tertiary amino group Am from the oxygen atom by two to three carbon atoms. Such alkylene group is preferably 1,2-ethylene, 1-methyl-1,2-ethylene, 2-methyl-1,2-ethylene or 1,3-propylene, but may also be 1,3-butylene, 2,3-butylene, 3,4-butylene, 1,4-butylene, 1,4-pentylene, 1,5-pentylene, 1,5-hexylene, 1,6-hexylene, 1,7-heptylene and the like.

A tertiary amino group, such as the group Am in the above formula, is, for example, N,N-di-substituted amino, in which each of the substituents is, for example, an aliphatic radical, such as lower alkyl, lower alkenyl and the like, a cycloaliphatic radical, such as cycloalkyl and the like, a cycloaliphatic-aliphatic radical, such as cycloalkyl-lower alkyl and the like, a carbocyclic aryl radical, such as monocyclic carbocyclic aryl and the like, or a carbocyclic aryl-aliphatic radical, such as monocyclic carbocyclic aryl-lower alkyl and the like, which radicals have preferably from one to ten carbon atoms. Preferred as substituents are lower alkyl, e.g. methyl, ethyl, propyl, isopropyl, butyl, isobutyl, secondary butyl, pentyl, neopentyl and the like; other substituents of the above type are lower alkenyl, e.g. allyl, 2-methylallyl and the like, cycloalkyl having from three to seven, preferably from five to six, ring carbon atoms, e.g. cyclopentyl, cyclohexyl and the like, cycloalkyl-lower alkyl, in which cyclo-alkyl has from three to seven, preferably from five to six, ring carbon atoms, e.g. cyclopentylmethyl, 2-cyclohexylethyl and the like, monocyclic carbocyclic aryl, e.g. phenyl and the like, or monocyclic carbocyclic aryl-lower alkyl, such as phenyl-lower alkyl, e.g. benzyl, 1-phenylethyl, 2-phenylethyl and the like. N,N-di-substituted amino groups are primarily N,N-di-lower alkyl-amino, in which lower alkyl has preferably from one to four carbon atoms, e.g. N,N-dimethylamino, N-methyl-N-ethylamino, N,N-diethylamino, N,N-di-n-propylamino, N,N-di-isopropylamino and the like, as well as N-cycloalkyl-N-lower alkyl-amino, in which cycloalkyl has preferably from five to six ring carbon atoms, and lower alkyl has preferably from one to four carbon atoms, e.g. N-cyclopentyl-N-methyl-amino, N-cyclohexyl-N-methyl-amino, N-cyclohexyl-N-ethyl-amino and the like, or N-lower alkyl-N-phenyl-lower alkyl-amino, in which lower alkyl has preferably from one to four carbon atoms, e.g. N-benzyl-N-methyl-amino, N-benzyl-N-ethyl-amino, N-ethyl-N-(1-phenylethyl)-amino, N-methyl-N-(2-phenylethyl)-amino and the like, or any other equivalent N,N-di-substituted amino group. The substituents, particularly lower alkyl, may also carry functional groups, such as hydroxyl, lower alkoxy, e.g. methoxy, ethoxy and the like, lower alkyl-mercapto, e.g. methylmercapto, ethylmercapto and the like, or any other suitable functional group; N,N-di-substituted-amino groups, in which the substituents carry functional groups, are, for example, N-hydroxy-lower alkyl-N-lower alkyl-amino, in which hydroxy is separated from the amino group by at least two, preferably by two to three, carbon atoms, e.g. N-(2-hydroxyethyl)-N-methyl-amino and the like, N,N-di-hydroxy-lower alkyl-amino, in which hydroxy is separated from the amino group by at least two, preferably by two to three, carbon atoms, e.g. N,N-di-(2-hydroxyethyl)-amino and the like.

The tertiary amino group, such as the group Am in the above formula, may also represent 1-N,N-alkylene-imino, in which alkylene has from four to eight carbon atoms, 1-N,N-aza-alkylene-imino group, in which aylklene has from four to six carbon atoms, or 1,N,N-oxa-alkylene-imino and 1-N,N-thia-alkylene-imino, in which alkylene has preferably four carbon atoms. Together with the nitrogen atom, these alkylene, aza-alkylene, oxa-alkylene or thia-alkylene radicals represent 1-N,N-alkylene-imino, in which alkylene has from four to eight carbon atoms, such as 1-pyrrolidino groups, e.g. 1-pyrrolidino, 2-methyl-1-pyrrolidino and the like, 1-piperidino groups, e.g. 1-piperidino, 2-methyl-1-piperidino, 4-methyl-1-piperidino, 3-hydroxy-1-piperidino, 3-acetoxy-1-piperidino, 3-hydroxymethyl-1-piperidino and the like, 1-N,N-(1,6-hexylene)-imino, 1-N,N-(1,7-heptylene)-imino and the like, 1-N,N-(aza-alkylene)-imino, particularly 1-N,N-(N-lower alkyl-aza-alkylene)-imino, in which alkylene has from four to six carbon atoms, such as 1-piperazino or particularly 4-lower alkyl-1-piperazino, e.g. 4-methyl-1-piperazino, 4-ethyl-1-piperazino and the like, as well as 4-hydroxyethyl-1-piperazino, 4-acetoxyethyl-1-piperazino and the like, 1-N,N-(3-aza-1,6-hexylene)-imino, particularly 1-N,N-(3-aza-3-lower alkyl-1,6-hexylene)-imino, e.g. 1-N,N-(3-aza-3-methyl-1,6-hexylene)-imino and the like, or 1-N,N-(4-aza-1,7-heptylene)-imino, particularly 1-N,N-(4-aza-4-lower alkyl-1,7-heptylene)-imino, e.g. 1-N,N-(4-aza-4-methyl-1,7-heptylene)-imino and the like, 4-morpholino groups, e.g. 4-morpholino, 3-methyl-4-morpholino and the like, 4-thiamorpholino groups, e.g. 4-thiamorpholino and the like, or any other equivalent tertiary amino group.

In the tertiary amino-lower alkyl-oxy group, the lower alkyl group, either partially or in toto, may form part of a saturated heterocyclic ring system, of which the tertiary amino group Am is a member and is separated from the oxy group by at least two carbon atoms. Such tertiary amino-lower alkyl group is, for example, 1-methyl-2-piperidinomethyl, 1-methyl-3-piperidinomethyl, 1-ethyl-4-piperidino, 1-methyl-3-pyrrolidinomethyl and the like.

Apart from the tertiary amino-lower alkyl-oxy group, the monocyclic carbocyclic aryl group Ar may have one or more than one additional substituent, which may be attached to any of the positions available for substitution. Such substituents are represented above all by halogeno, e.g. fluoro, chloro, bromo or iodo, as well as by lower alkyl, e.g. methyl, ethyl, isopropyl and the like, halogeno-lower alkyl, e.g. trifluoromethyl and the like, or any other suitable substituent, for example, an additional tertiary amino-lower alkyl-oxy group of the formula $$-O-(C_mH_{2m})-Am$$

in which Am and the group of the formula $-(C_mH_{2m})-$ have the previously given meaning.

The group R substituting one of the carbon atoms of the alkylene radical of the formula $-(C_nH_{2n-2})-$ or the alkenylene radical of the formula $-(C_nH_{2n-4})-$ is primarily hydrogen, but may also stand for an aliphatic group, particularly lower alkyl, e.g. methyl, ethyl, n-propyl, isopropyl and the like, or any other suitable aliphatic radical.

Salts of the compounds of this invention are acid addition salts, such as pharmaceutically acceptable, non-toxic acid addition salts with inorganic acids, e.g. hydrochloric, hydrobromic, sulfuric, phosphoric acids and the like, or organic acids, such as organic carboxylic acids, e.g. acetic, propionic, pivalic, glycolic, lactic, malonic, succinic, maleic, hydroxy-maleic, malic, tartaric, citric, benzoic, salicylic, 2-acetoxybenzoic, nicotinic, isonicotinic acid and the like, or organic sulfonic acids, e.g. methane sulfonic, ethane sulfonic, ethane 1,2-disulfonic, 2-hydroxyethane sulfonic, p-toluene sulfonic, napthalene 2-sulfonic acid and the like, or any other suitable acid. Other acid addition salts may be useful as intermediates, for example, in the preparation of pharmaceutically acceptable, non-toxic acid addition salts or in the purification of the free bases, as well as for identification or characterization purposes. Salts, which are prepared primarily for identification purposes, are, for example, those with acidic organic nitro compounds, e.g. picric, picrolonic, flavianic acid and the like, or metal complex acid, e.g. phosphotungstic, phosphomolybdic, chloroplatinic, Reinecke acid and the like. Mono- or poly-salts may be formed depending on the number of salt-forming groups and/or the conditions used for the salt formation.

Also included within the scope of the present invention are the N-oxides of the aforementioned compounds, as well as the acid addition salts of such N-oxides, for example, the pharmaceutically acceptable, non-toxic acid addition salts of N-oxides, such as those with the above-mentioned acids.

Quaternary ammonium compounds of the compounds of this invention are those formed with reactive esters from alcohols and strong inorganic or organic acids, particularly those with lower aliphatic halides, sulfates, or sulfonates, such as lower alkyl halides, e.g. methyl, ethyl, n-propyl or isopropyl chloride, bromide, iodide and the like, di-lower alkyl sulfates, e.g. dimethyl sulfate, diethyl sulfate and the like, lower alkyl lower alkane sulfonates, e.g. ethyl or methyl methane sulfonate, ethane sulfonate and the like, lower alkyl lower hydroxy-alkane sulfonates, e.g. methyl 2-hydroxy-ethane sulfonate and the like, or lower alkyl monocyclic carbocyclic aryl sulfonates, e.g. methyl p-toluene sulfonate, ethyl p-toluene sulfonate and the like, as well as those with carbocyclic aryl-aliphatic halides, such as phenyl-lower alkyl halides, e.g. benzyl, 1-phenylethyl or 2-phenylethyl chloride, bromide or iodide and the like. Also included as quaternary ammonium compounds are the corresponding quaternary ammonium hydroxides, and the quaternary ammonium salts with acids other than hydrohalic, sulfuric or organic sulfonic acids, particularly those with the organic carboxylic acids mentioned hereinabove.

The compounds of this invention have antifungal properties and can be used accordingly. For example, they show antidermatophyte effects against fungi causing superficial dermatophytoses, such as Trichophyton mentagrophytes, Trichophyton gallinae, Trichophyton interdigitale, Microsporum audouini, Microsporum canis, Microsporum gypseum and the like, and can be used in the treatment of infections caused by such microorgamisms, particularly of topical fungal infections of the skin, such as dermatophytosis (athlete's foot) and the like. They have also antifungal effects against fungi causing chronic infections of the skin and the subcutaneous tissue, such as *Sporotrichium schenkii* and the like, or fungi causing deep seated systemic mycoses (yeasts), such as *Candida albicans*, *Cryptococcus neoformans*, *Histoplasma capsulatum* and the like, and can be used in the treatment of infections caused by such microorganisms.

Furthermore, the compounds of this invention are active against actinomyces, such as *Nacardia asteroides* and the like, against bacteria, such as gram-positive bacteria, for example, *Diplococcus pneumoniae*, *Staphylococcus aureus* and the like, or gram-negative bacteria, for example, *Escherichia coli*, *Pseudomonas aeruginosa* and the like, and against protozoa, such as *Trichomonas vaginalis* and the like, and can, therefore, be used in the treatment of infections caused by such actinomyces bacteria and protozoa of the above type.

In addition, compounds of this invention have estrogenic properties, and can be used in place of other estrogenic agents, e.g. estradiol, stilbestrol, hexestrol and the like, for example, in the treatment of animals to increase weight gain and efficiency of feed utilization and the like.

Particularly useful are the compounds having one of the formulae:

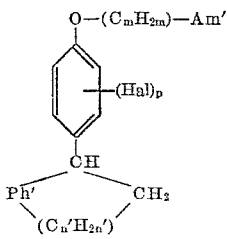

and

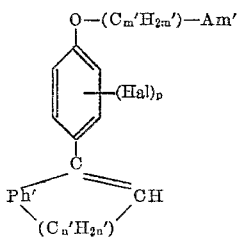

in which Ph' stands primarily for 1,2-phenylene, as well as (lower alkyl)-1,2-phenylene, (lower alkoxy)-1,2-phenylene, (halogeno)-1,2-phenylene, (nitro)-1,2-phenylene, (N,N-di-lower alkyl-amino)-1,2-phenylene or (trifluoromethyl)-1,2-phenylene, the group of the formula —($C_n'H_{2n}'$)— stands for an unbranched lower alkylene radical, having preferably from one to three, preferably from one to two, carbon atoms (i.e. the letter $n'$ stands for one of the integers from 1 to 3, preferably for one of the integers 1 and 2), Am stands above all for N,N-di-lower alkyl-amino, as well as N,N-alkyleneimino, in which alkylene has from four to seven carbon atoms, 4-morpholino or 4-lower alkyl-1-piperazino, the group of the formula —($C_m'H_{2m}'$)— stands for alkylene having from two to three, preferably two, carbon atoms (i.e. the letter $m'$ stands for one of the integers 2 and 3, preferably for the integer 2), and separates the group Am from the oxygen atom by two to three, preferably by two, carbon atoms, Hal stands for halogeno, especially chloro, as well as bromo and the like, and the letter p stands for one of the integers 0, 1 and 2, particularly for 1, and the acid addition salts, particularly the pharmaceutically acceptable, non-toxic acid addition salts thereof.

The compounds of the present invention may be prepared according to methods known per se; for example, they may be formed by converting in a compound having one of the formulae:

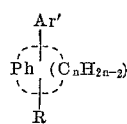

and

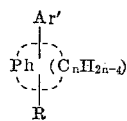

in which Ph, R and the groups of the formulae

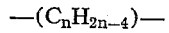

—($C_nH_{2n-2}$)— and —($C_nH_{2n-4}$)— have the previously given meaning, and Ar' is a mono-cyclic carbocyclic aryl group having as a substituent a hydroxyl group, or a metal compound thereof, the hydroxyl group substituting the group Ar' into a tertiary amino-lower alkyl-oxy group, and, if desired, converting in a resulting compound having an unbranched alkenylene radical of the formula —($C_nH_{2n-4}$)— such radical into into an unbranched alkylene radical of the formula —($C_nH_{2n-2}$)—, and/or, if desired, converting a resulting salt into the free compound or into another salt, and/or, if desired, converting a resulting compound into an N-oxide or a quaternary ammonium compound thereof, and/or, if desired, converting a resulting compound or an N-oxide into a salt thereof, and/or, if desired, converting a quaternary ammonium compound into another quaternary ammonium compound, and/or, if desired, separating a mixture of isomers into the single isomers.

The conversion of the hydroxyl group substituting the radical Ar' into the desired tertiary amino-lower alkyl-oxy group is carried out according to known procedures. For example, the starting material having the phenolic hydroxyl group as a substituent of the group Ar may be converted into a metal salt, particularly an alkali metal, e.g. lithium, sodium, potassium and the like, salt. Formation of the metal compound may be achieved, for example, by reacting the starting material with a metal compound-forming reagent, such as an alkali metal hydride or amide, e.g. lithium hydride, sodium hydride, sodium amide, potassium amide and the like, or any other suitable reagent, such as an alkali metal lower alkanolate, e.g. lithium, sodium or potassium methanolate, ethanolate, tertiary butanolate and the like, or an alkali metal compound of a hydrocarbon, e.g. butyl lithium, phenyl lithium, phenyl sodium and the like. The preparation of the metal compounds is carried out in the presence of an inert solvent, e.g. hexane, benzene, toluene, xylene, diethyl ether, p-dioxane, tetrahydrofuran, diethyleneglycol dimethylether, N,N-dimethylformamide and the like, or any other suitable solvent, such as a lower alkanol, e.g. methanol, ethanol and the like, if necessary, while cooling or at an elevated temperature, and/or in the atmosphere of an inert gas.

The starting material, particularly the metal compound thereof, is then reacted with a reactive ester of a tertiary amino-lower alkanol, particularly a compound of the formula Am—($C_mH_{2m}$)—X, in which Am and the group of the formula —($C_mH_{2m}$)— have the previously given meaning, and X stands for a reactive esterified hydroxyl group. The latter is above all a hydroxyl group esterified with a strong mineral acid, such a hydrohalic acid, e.g. hydrochloric, hydrobromic acid and the like; therefore, the group X represents primarily halogeno, e.g. chloro, bromo and the like. It may also be a hydroxyl group esterified with a strong organic sulfonic acid, such as a lower alkane sulfonic acid, e.g. methane sulfonic, ethane sulfonic acid and the like, or a monocyclic carbocyclic aryl-sulfonic acid, e.g. p-toluene sulfonic acid and the like; thus, the group X may also stand for lower alkyl-sulfonyloxy, e.g. methylsulfonyloxy, ethylsulfonyloxy and the like, or monocyclic carbocyclic aryl-sulfonyloxy, e.g. p-tolylsulfonyloxy and the like. The preferred reactive esters of a tertiary amino-lower alkanol are those having the formula Am—$(C_mH_{2m})$—Hal, in which Am, and the group of the formula —$(C_mH_{2m})$— have the previously given meaning, and Hal represents halogeno, particularly chloro.

The reaction of the starting material,, particularly a metal compound thereof, with the reactive ester of a tertiary amino-lower alkanol is carried out in the presence of a suitable diluent, for example, in the solvent used for the preparation of a metal compound, if necessary, while cooling or at an elevated temperature, and/or, in the atmosphere of an inert gas, e.g. nitrogen.

The starting material used in the above reaction is known or may be prepared according to known methods. For example, a compound of the formula

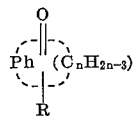

in which Ph and R have the previously given meaning, and the group of the formula —$(C_nH_{2n-2})$— represents an unbranched alkylene radical having from three to five carbon atoms and substituted by the group R and the oxo group =O, may be reacted with a reagent of the formula $M^⊕ Ar_0^⊖$, in which $Ar_0$ is a monocyclic carbocyclic aryl radical substituted by a group capable of being converted into a hydroxyl group (such as lower alkoxy, e.g. methoxy, ethoxy and the like, a benzyloxy group, e.g. benzyloxy, 1-phenylethyloxy and the like, an acyloxy group, such as lower alkanoyloxy, e.g. acetyloxy and the like) and $M^⊕$ is the cation of certain metals of the IA-group of the Periodic System (i.e. of certain alkali metals), e.g. lithium, sodium and the like, or the group of the formula Hal—$Mg^⊕$, in which Hal has the above given meaning, i.e. is halogeno, e.g. chloro, bromo, iodo and the like. In a resulting compound of the formula

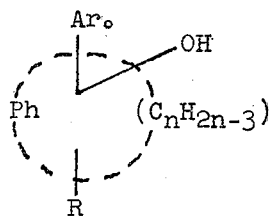

in which Ph, R and $Ar_0$ have the previously given meaning, and the unbranched alkylene group of the formula —$(C_nH_{2n-3})$—, having from three to five carbon atoms, is substituted by R, $Ar_0$ and the hydroxyl group, whereby $Ar_0$ and the hydroxyl group substitute the same carbon atom, the elements of water are split off by dehydration (for example, by treatment with a suitable acid) and a group substituting $Ar_0$ and capable of being converted into a hydroxyl group, is so converted (for example, by hydrolysis with an acid reagent, such as an aqueous hydrohalic acid, e.g. concentrated hydrobromic acid and the like, or with a suitable salt of a weak organic base and a strong inorganic acid, e.g. pyridine hydrochloride and the like, or with a basic reagent, e.g. sodium hydroxide and the like, or by hydrogenolysis, e.g. by treatment with hydrogen in the presence of a suitable metal catalyst, depending on the type of substituent to be converted into the hydroxyl group) to yield the desired starting material having an unbranched alkenylene group of the formula —$(C_nH_{2n-4})$— carrying the groups Ar′ and R. In the hydroxylated compound having the above formula, the hydroxyl group may be replaced by hydrogen, which is achieved by hydrogenolysis (for example, by hydrogenation in the presence of a suitable catalyst); in the resulting compound the group capable of being converted into a hydroxyl group and substituting the group Ar′, is so converted (for example, by acid hydrolysis with an aqueous hydrohalic acid, e.g. hydrobromic acid and the like) to yield the desired starting material having an unbranched alkylene group of the formula —$(C_nH_{2n-2})$— carrying the group Ar′ and R.

The latter starting materials may also be prepared by reacting a compound having one of the formulae:

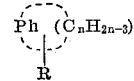

and

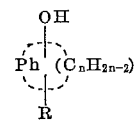

in which Ph and R have the previously given meaning, the group of the formula —$(C_nH_{2n-3})$— is an unbranched alkenylene radical having from three to five carbon atoms and carrying the group R, and the group of the formula —$(C_nH_{2n-2})$— is an unbranched alkylene radical having from three to five carbon atoms and carrying the group R and the hydroxyl group —OH, with a compound of the formula H—Ar′, in which Ar′ has the previously given meaning, in the presence of a suitable Lewis acid, such as a strong inorganic acid, e.g. sulfuric acid and the like, or a Friedel-Crafts reagent, e.g. aluminum chloride and the like; this reaction is carried out according to known procedures.

The compounds of this invention may also be prepared, for example, by reacting a compound having one of the formulae:

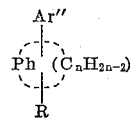

and

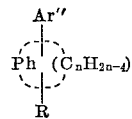

in which Ph, R and the groups of the formulae —$(C_nH_{2n-2})$— and —$(C_nH_{2n-4})$— have the previously given meaning, and Ar″ is a monocyclic carbocyclic aryl group having as a substituent a reactive esterified hydroxy-lower alkyl-oxy group, in which the reactive esterified hydroxy portion is separated from oxy by at least two carbon atoms, with a secondary amine, and, if desired, carrying out the optional steps.

A reactive esterified hydroxy-lower alkyl-oxy group is particularly a group of the formula —O—$(C_mH_{2m})$—X, in which X and the group of the formula —$(C_mH_{2m})$— have the previously given meaning; the reactive esterified hydroxyl group X is primarily a group Hal representing halogeno, particularly chloro; it may also be a suitable organic sulfonyloxy, such as one of those mentioned above. The reaction of the starting material with the secondary amine, having preferably the formula H—Am, in which Am has the above given meaning, is carried out in such manner, that an excess of the amine or of any other suitable base is present to neutralize the generated acid. If necessary, the reaction mixture may be diluted with a suitable inert solvent, and, if necessary, the reaction is carried out while cooling or at an elevated temperature, and/or in the atmosphere of an inert gas, e.g. nitrogen, and/or in a closed vessel.

The starting material used in the above reaction is prepared according to known methods, for example, by reacting the alkali metal compound of the starting material of the previous procedure, having one of the formulae

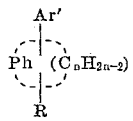

and

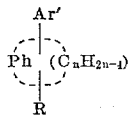

in which Ph, Ar, R and the groups of the formulae —$(C_nH_{2n-2})$— and —$(C_nH_{2n-4})$— have the previously given meaning, with a halogeno-lower alkanol, in which halogeno is separated from the hydroxyl group by at least two carbon atoms, or with a halogeno-lower alkyl halide, in which the two halogeno atoms are separated by at least two carbon atoms, for example, a chloro-lower alkyl bromide, in which chloro is separated from bromo by at least two carbon atoms, and, if necessary, converting in a resulting compound, in which the monocyclic carbocyclic aryl group has a hydroxy-lower alkyloxy substituent, the hydroxyl group of such substituent into an esterified hydroxyl group (for example, by treatment with a thionyl halide, e.g. thionyl chloride and the like, a phosphorus halide, e.g. phosphorus tribromide and the like, or with an organic sulfonic acid halide, e.g. chloride and the like, in the presence of a suitable base, e.g. pyridine and the like).

The compounds of this invention having the previously given Formula I may also be prepared, for example, by replacing in a compound of the formula

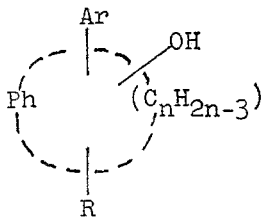

in which Ph, Ar and R have the previously-given meaning, and the radical of the formula —$(C_nH_{2n-3})$— is an unbranched alkylene radical having from three to five carbon atoms and carrying, in addition to the groups Ar and R, the hydroxyl group —OH, the hydroxyl group by hydrogen, and carrying out the optional steps.

The hydroxyl group —OH preferably substitutes the same carbon atom as the group Ar. It may be replaced, for example, by treating the starting material with hydrogen in the presence of a catalyst, e.g. a palladium catalyst, Raney nickel and the like, and of a suitable diluent, e.g. ethanol and the like, if necessary at an increased pressure and/or at an elevated temperature.

The starting materials used in the above reaction are prepared according to known methods, for example, by reacting a compound of the formula

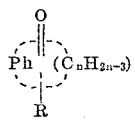

in which Ph and R have the previously-given meaning, and the group of the formula —$(C_nH_{2n-3})$— is an unbranched alkylene radical having from three to five carbon atoms and carrying, in addition to the group R, the oxo group =O, with a Grignard reagent of the formula HalMg⊕[Ar]⊖, in which Ar has the previously-given meaning, and Hal is halogeno, particularly bromo and the like, and carefully decomposing the resulting complex, for example, with aqueous ammonium chloride. The intermediates used in the above Grignard reaction are known or may be prepared according to known methods; the Grignard reagent may be prepared, for example, according to the "Method of Entrainment," described by Kharash and Reinmuth, Grignard Reactions of Non-metallic Substances (Prentice Hall, 1954). In case of R being an aliphatic organic radical, the starting material may also be prepared, for example, by reacting a compound of the formula

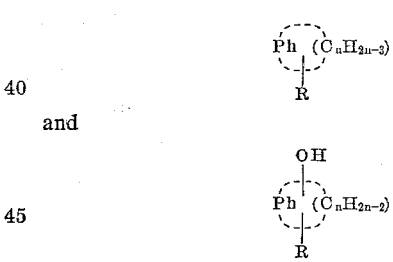

in which Ph, Ar and the group of the formula

—$(C_nH_{2n-3})$— have the previously-given meaning, with a reagent of the formula HalMg⊕[$R_a$]⊖, in which Hal has the previously-given meaning, and $R_a$ stands for an aliphatic radical representing R.

The compounds of this invention having the Formula I may also be prepared, for example, by reacting a compound having one of the formulae:

and

in which Ph and R have the previously-given meaning, the group of the formula —$(C_nH_{2n-3})$— is an unbranched alkenylene radical having from three to five carbon atoms and carrying the group R, and the group of the formula —$(C_nH_{2n-2})$— is an unbranched alkylene radical having from three to five carbon atoms and carrying the group R and the hydroxyl group —OH, with a compound of the formula H—Ar, in which Ar has the previously-given meaning, in the presence of a strong Lewis acid, and, if desired, carrying out the optional steps.

In the above starting materials, the unbranched alkenylene group is particularly an unbranched 1-alkenylene group, i.e. the double bond of the alkenylene radical is in conjugation with those of the 1,2-phenylene radical. The hydroxyl group substituting the unbranched alkylene radical is preferably located at the 1-position, i.e. adjacent to the 1,2-phenylene radical. The reaction is carried out according to known methods, for example, by reacting the two components in the presence of a Lewis acid, such as a strong inorganic acid, e.g. sulfuric acid and the like, or a Friedel-Crafts reagent, e.g. aluminum chloride or any other suitable reagent. The starting materials used in the above reaction are known or may be prepared according to known methods; particularly useful as starting materials are compounds, in which the group R represents hydrogen.

The compounds of this invention having the Formula

II may also be prepared by eliminating from a compound of the formula

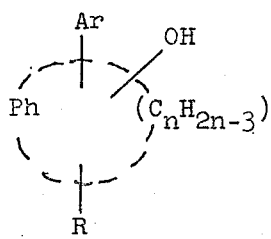

in which Ph, Ar and R have the previously-given meaning, and the group of the formula —($C_nH_{2n-3}$)— is an unbranched akylene radical having from three to five carbon atoms and carrying, in addition to the groups Ar and R, a hydroxyl group —OH, the elements of water, and, if desired, carrying out the optional steps.

The hydroxyl group in the above starting material is preferably attached to the same carbon atom as the group Ar; in case the group R stands for an organic radical, it may also substitute the same carbon atom as the latter group. The removal of water by dehydration is achieved, for example, by heating, or more preferably, by treatment with a dehydrating reagent, especially an acidic dehydrating agent, such as an inorganic acid, e.g. hydrochloric, hydrobromic, hydriodic, sulfuric acid and the like, an inorganic acid halide, e.g. thionlyl chloride, phosphorus chloride and the like, or any other suitable inorganic acidic reagent, e.g. ammonium chloride and the like, as well as an organic acid, e.g. p-toluene sulfonic acid and the like, an organic acid halide, e.g. acetic acid chloride, p-toluene sulfonyl chloride and the like, an organic acid anhydride, e.g. acetic acid anhydride, propionic acid anhydride and the like, or any other suitable organic acidic dehydrating reagent, e.g. pyridine hydrochloride and the like; if necessary, the reaction is carried out in the presence of a suitable diluent, preferably at an elevated temperature, in a closed vessel, and/or in the atmosphere of an inert gas, e.g. nitrogen.

The starting materials used in the above reaction may be prepared according to the previously described methods.

A resulting compound having the Formula II may be converted into a compound having the Formula I; thus, in a resulting compound of the formula

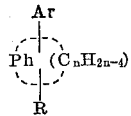

in which Ph, Ar and R have the previously-given meaning, and the group of the formula —($C_nH_{2n-4}$)— is an unbranched alkenylene radical having from three to five carbon atoms and carrying the groups Ar and R, the alkenylene radical of the formula —($C_nH_{2n-4}$)— may be converted into an alkylene radical of the formula —($C_nH_{2n-2}$)—

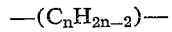

having from three to five carbon atoms and carrying the groups Ar and R.

The conversion of the alkenylene radical into an alkylene radical is carried out according to methods known per se, for example, by treatment with an alkali metal, e.g. sodium and the like, in the presence of a lower alkanol, with metal amalgam in the presence of a hydrogen donor, e.g. sodium amalgam in the presence of moist diethyl ether, catalytically activated hydrogen, such as hydrogen in the presence of a palladium catalyst and the like, or any other suitable method.

A resulting salt may be converted into the free base, for example, by reacting it with an alkaline reagent, such as a metal hydroxide, e.g. lithium hydroxide, sodium hydroxide, potassium hydroxide, calcium hydroxide and the like, a metal carbonate, e.g. sodium, potassium or calcium carbonate or hydrogen carbonate and the like, ammonia and the like, or by treatment with a suitable hydroxyl ion exchange resin.

A resulting salt, particularly a salt with an inorganic acid, may be converted into another salt, for example, by reacting it with a suitable metal e.g. sodium, barium, silver and the like, salt of an acid, preferably in the presence of a diluent, in which a resulting inorganic salt is insoluble and is thus removed from the reaction, or by treating it with an anion exchange preparation.

A free base may be converted into an acid addition salt thereof by reacting it or a solution thereof in a suitable solvent or solvent mixture with the acid or a solution thereof, or with a suitable anion exchange preparation, and isolating the desired salt. A salt may be obtained in the form of a hydrate thereof or may include solvent of crystallization.

An N-oxide of the compounds of this invention may be prepared according to known methods, for example, by treating the free base with a suitable reagent, such as hydrogen peroxide, ozone or a peracid, e.g. peracetic, perbenzoic, monoperphthalic, persulfuric acid and the like, in the presence of a suitable inert diluent. An N-oxide may be converted into a salt thereof according to the above procedure.

Quaternary ammonium derivatives of the compounds of this invention may be obtained, for example, by reacting the base with a reactive ester of an alcohol and a strong acid, such as, for example, with one of the lower alkyl halides, di-lower alkyl sulfates, lower alkyl sulfonates, phenyl-lower alkyl halides described above. The quaternizing reaction may be performed in the absence or presence of a solvent, while cooling or at an elevated temperature, if necessary, in a closed vessel and/or in the atmosphere of an inert gas, e.g. nitrogen and the like. Resulting quaternary ammonium compounds may be converted into other quaternary ammonium compounds, such as the quaternary ammonium hydroxides, for example, by reacting a quaternary ammonium halide with silver oxide, or a quaternary ammonium sulfate with barium hydroxide, by treating a quaternary ammonium salt with a hydroxyl ion exchange preparation, by electrodialysis or any other suitable method. A quaternary ammonium hydroxide may be converted into a quaternary ammonium salt by reacting the former with a suitable acid. A quaternary ammonium salt may also be converted directly into another quaternary ammonium salt; for example, a quaternary ammonium iodide may be reacted with freshly prepared silver chloride or with hydrochloric acid in anhydrous methanol to yield the desired quaternary ammonium chloride, or a quaternary ammonium salt may be treated with a suitable anion exchange preparation and thus be converted into another quaternary ammonium salt. A quaternary ammonium compound may be obtained in the form of a hydrate thereof or may contain solvent of crystallization.

A mixture of resulting isomeric compounds may be separated into the single isomers. For example, a mixture of diastereoisomers may be separated into the individual racemic compounds on the basis of physico-chemical differences, such as solubility, for example, by fractional crystallization and the like. Racemates may be resolved into the optically active d- and l-forms according to known resolution procedures, for example, by forming a salt of the free racemic base with one of the optically active forms of an acid containing an asymmetric carbon atom. Especially useful as optically active forms of salt-forming acids having an asymmetric carbon atom are D-tartaric (l-tartaric) and L-tartaric (d-tartaric) acid, as well as the optically active forms of malic, mandelic, camphor 10-sulfonic, quinic acid and the like. From a resulting salt, the free and optically active base may be obtained according to the method described above, and a free and optically active base may be converted into its acid addition salt, N-oxide, salt of an N-oxide or quaternary ammonium compound according to the procedures described above.

The invention also comprises any modification of the process wherein a compound formed as an intermediate at any stage of the process is used as starting material and the remaing step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

A solution of 10.0 g. of 1-(4-hydroxy-phenyl)-indane in xylene is added to a hot mixture of 3.5 g. of a 50 percent mineral oil suspension of sodium hydride and xylene while stirring. The mixture is refluxed for three hours, then cooled to room temperature, and treated dropwise with 8.0 g. of 2-N,N-diethylaminoethyl chloride. After refluxing for sixteen hours and cooling, the reaction mixture is extracted with concentrated hydrochloric acid; the aqueous phase is made basic with ammonium hydroxide and extracted with diethyl ether. The organic extract is washed with water, dried over sodium sulfate and evaporated to dryness. The residue is distilled to yield the 1-[4-(2-N,N-diethylaminoethyl)-oxy-phenyl]-idane of the formula:

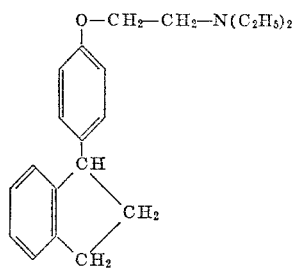

which boils at 175–177°/0.1 mm.; yield: 9 g.

The hydrochloride salt of 1-[4-(2-N,N-diethylaminoethyl)-oxy-phenyl]-indane, M.P. 130–133°, is prepared by treating a solution of the free base with hydrogen chloride and recrystallizing the resulting salt from a mixture of ethanol and diethyl ether.

*Example 2*

The sodium salt of 1-(4-hydroxy-phenyl)-indane, prepared from 20.0 g. of 1-(4-hydroxy-phenyl)-indane and 7.0 g. of a 50 percent mineral oil suspension of sodium hydride in xylene, is treated with 17.7 g. of 3-N,N-dimethylaminopropyl chloride. The reaction is carried out as described in Example 1; the resulting 1-[4-(3-N,N-dimethylaminopropyl)-oxy-phenyl]-indane of the formula:

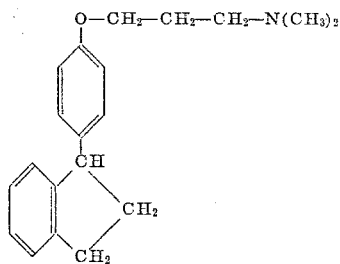

boils at 168–170°/0.4 mm.

*Example 3*

The 1-[4-(N,N-dimethylaminoisopropyl)-oxy-phenyl]-indane of the formula

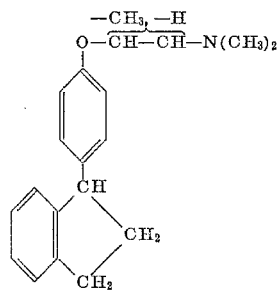

is prepared by reacting 10.0 g. of 1-(4-hydroxy-phenyl)-indane with 3.5 g. of a 50 percent mineral oil suspension of sodium hydride in xylene, and treating the resulting sodium salt of 1-(4-hydroxy-phenyl)-indane with 7.2 g. of N,N-dimethylamino-isopropyl chloride according to the procedure described in Example 1; the resulting base boils at 170–173°/0.2 mm.; yield: 8.75 g.

*Example 4*

The sodium salt of 1-(4-hydroxy-phenyl)-indane is prepared by reacting 10.0 g. of 1-(4-hydroxy-phenyl)-indane with 2.5 g. of a 54 percent suspension of sodium hydride in xylene according to the method described in Example 1; the salt is reacted with 5.7 g. of 2-N,N-dimethylaminoethyl chloride, and the reaction mixture is worked up as shown in Example 1 to yield 9 g. of 1-[4-(2-N,N-dimethylaminoethyl)-oxy-phenyl]-indane of the formula

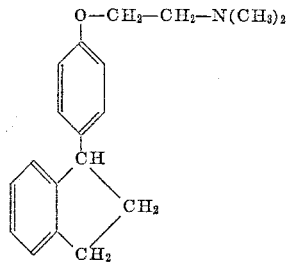

which boils at 174–176°/0.3 mm. The hydrochloride salt of 1-[4-(2-N,N-dimethylaminoethyl)-oxy-phenyl]-indane melts at 178–180° after recrystallization from a mixture of ethanol and diethyl ether.

*Example 5*

The 1-{4-[2-(1-piperidino)-ethyl]-oxy-phenyl}-indane of the formula

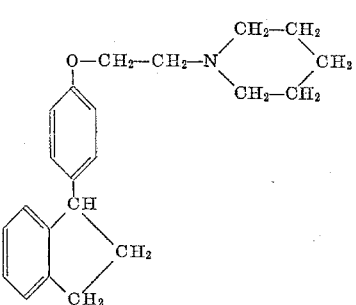

B.P. 199–201°/0.25 mm., is prepared by reacting 10.0 g. of 1-(4-hydroxy-phenyl)-indane with 2.5 g. of a 54 percent mineral oil suspension of sodium hydride in xylene and treating the resulting salt with 8.7 g. of 2-(1-piperidino)-ethyl chloride; 8.5 g. of the desired 1-{4-[2-(1-piperidino)-ethyl]-oxy-phenyl}-indane is recovered and converted into its hydrochloride salt, M.P. 160–163° (after recrystallization from a mixture of ethanol and diethyl ether).

*Example 6*

To a mixture of 1.67 g. of sodium hydride (as a 50 percent suspension in mineral oil) in 50 ml. of xylene, while heating almost to reflux, is added dropwise a solution of 7 g. of 1-(3-chloro-4-hydroxy-phenyl)-indane in xylene. The reaction mixture is refluxed for three hours; a solution of 3.8 g. of 2-N,N-diethylaminoethyl chloride in xylene is then added while stirring, and refluxing is continued overnight. After cooling, the reaction mixture is acidified by cautiously adding 15 percent aqueous hydrochloric acid. The aqueous layer is separated, made basic with ammonium hydroxide and extracted with diethyl ether. The organic phase is separated, washed with water, dried over magnesium sulfate and evaporated to yield the 1-[3-chloro-4-(2-N,N-diethylaminoethyl)-oxyphenyl]-indane of the formula

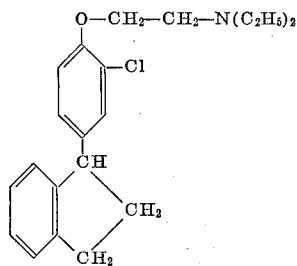

which is converted into its hydrochloride, M.P. 147–149°, by treating a solution of the free base in ethanol with hydrogen chloride and recrystallizing the salt from ethanol.

The starting material used in the above procedure is prepared as follows: A total of 42.0 g. of 1-(4-hydroxy-phenyl)-indane is gradually added to a solution of 4.6 g. of sodium in 200 ml. of ethanol. The reaction mixture is refluxed for two hours, the ethanol is evaporated, and the residue is dried for two days under high vacuum to yield the sodium salt of 1-(4-hydroxy-phenyl)-indane, which is then dissolved in 150 ml. of carbon disulfide. Chlorine gas is bubbled through the solution until one molar equivalent is absorbed, maintaining a temperature of 20–25° with ice-cooling. The inorganic precipitate is filtered off, the carbon disulfide is evaporated under reduced pressure, and the residue is diluted with water. The organic material is extracted with diethyl ether, the organic layer is separated, dried over magnesium sulfate and evaporated to yield the 1 - (3-chloro-4-hydroxy-phenyl)-indane, which purified by distillation and is collected at 160–163°/0.5 mm. A small amount of the 1-(3,5 - dichloro-4-hydroxy-phenyl)-indane is collected at 175°/0.5 mm.

*Example 7*

A mixture of 2.4 g. of 1-(4-hydroxy-phenyl)-1-methyl-1,2,3,4-tetrahydro-naphthalene and 0.5 g. of a 53 percent suspension of sodium hydride in 20 ml. of N,N-dimethyl-formamide is stirred for one hour and then treated with 1.16 g. of 2-N,N-diethylaminoethyl chloride in 20 ml. of toluene. The reaction mixture is allowed to stand at room temperature for 18 hours, concentrated to a volume of about 10 ml. and diluted with water. The organic material is extracted with diethyl ether; the organic extracts are combined and washed with 1 N aqueous hydrochloric acid. The acid solution is made basic with concentrated ammonium hydroxide, and the desired 1-[4-(2-N,N-diethylaminoethyl)-oxy-phenyl]-1-methyl-1,2,3,4 - tetrahydro-naphthalene of the formula

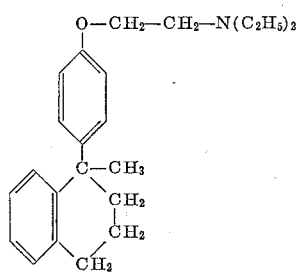

is extracted with diethyl ether, and isolated by evaporating the dried ether solution and distilling the residue, B.P. 159–161°/0.05 mm.

The starting material used in the above procedure is prepared as follows: A mixture of 16.2 g. of 1-methyl-1,2,3,4-tetrahydro-naphthalene, 18.8 g. of phenol and 2.5 g. of aluminum chloride in 200 ml. of hexane is stirred for one hour at room temperature and for another hour at 40–50°. After standing overnight at room temperature, the reaction mixture is again heated to 40–50°, filtered while warm, and the filtrate is stirred into 200 ml. of warm water. The organic layer is separated, washed with dilute aqueous hydrochloric acid, water and a saturated aqueous solution of sodium chloride, dried over sodium sulfate and evaporated to dryness. The 1-(4-hydroxy-phenyl)-1-methyl-1,2,3,4 - tetrahydro-naphthalene, obtained as a slightly brownish oil, crystallizes, M.P. 123–124°.

*Example 8*

To a solution of 3.17 g. of 1-[3,5-dichloro-4-hydroxy-phenyl]-1-methyl-1,2,3,4 - tetrahydro-naphthalene in 25 ml. of N,N-dimethylformamide is added 0.48 g. of a 53 percent suspension of sodium hydride in mineral oil; the mixture is stirred for one hour and then treated with 1.35 g. of 2-N,N-diethylaminoethyl chloride in 20 ml. of toluene. The reaction mixture is allowed to stand at room temperature for 18 hours and is then concentrated to a volume of about 10 ml. and diluted with water. The aqueous mixture is extracted with diethyl ether, the organic phase is separated and washed with 1 N aqueous hydrochloric acid. The desired 1-[3,5-dichloro-4-(2-N,N-diethylaminoethyl)-oxy-phenyl]-1 - methyl - 1,2,3,4-tetrahydro-naphthalene hydrochloride of the formula

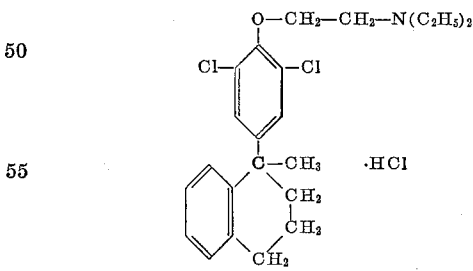

crystallizes spontaneously, is collected and recrystallized twice from a mixture of acetone and diethyl ether, M.P. 174–175°; yield: 2.35 g.

The starting material used in the above reaction is prepared as follows: A solution of 1-(4-hydroxy-phenyl)-1-methyl-1,2,3,4-tetrahydro-naphthalene in 13 g. of sulfuryl chloride is heated to reflux for three hours. The excess of sulfuryl chloride is removed under reduced pressure and the remaining dark oil is dissolved in diethyl ether. The organic solution is washed with 25 ml. of a saturated aqueous solution of sodium hydrogen carbonate and a saturated aqueous solution of sodium chloride, dried over sodium sulfate and evaporated to dryness. The dark viscous oil is distilled to yield the colorless 4-(3,5-dichloro - 4 - hydroxy - phenyl) - 1 - methyl - 1,2,3,4-tetrahydro-naphthalene, B.P. 140–143°/0.05 mm.

Example 9

To a mixture of 1.68 g. of a sodium hydride preparation (50 percent suspension of sodium hydride in mineral oil) in xylene is added dropwise a solution of 8.8 g. of 1-(3,5-dichloro-4-hydroxy - phenyl) - indane in xylene while heating almost to reflux. The reaction mixture is refluxed for three hours and treated dropwise with 4.75 g. of 2-N,N-diethylaminoethyl chloride in xylene while stirring. After refluxing over night, 15 percent aqueous hydrochloric acid is cautiously added; the aqueous layer is separated and made basic with aqueous ammonia. The organic material is extracted with diethyl ether, the organic solution is washed, dried and evaporated to yield the desired 1-[3,5-dichloro-4-(2-N,N-diethylaminoethyl)-oxy-phenyl]-indane of the formula

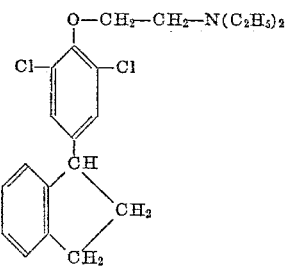

which is purified by distillation, B.P. 197–200°/0.2 mm. Its hydrochloride, formed by adding ethanolic hydrogen chloride and diethyl ether to the free base, melts at 139–142° after recrystallization from a mixture of ethanol and diethyl ether.

The starting material used in the above example may be prepared as follows: Chlorine gas is bubbled during 45 minutes through a solution of 15 g. of the sodium salt of 1-(4-hydroxy-phenyl)-indane (prepared as described in Example I) in 225 ml. of carbon disulfide while stirring and cooling. The inorganic precipitate is filtered off, the filtrate is evaporated under reduced pressure, and the residue is diluted with water. The organic material is extracted with diethyl ether; the organic solution is dried over magnesium sulfate and evaporated. The residue is distilled to yield the 1 - (3,5-dichloro-4-hydroxy-phenyl)-indane, B.P. 163–165°/0.2 mm.

Example 10

A mixture of 5.0 g. of 1-(4-hydroxy-phenyl)-1,2,3,4-tetrahydro-naphthalene and 1.0 g. of a 53 percent suspension of sodium hydride in mineral oil, in 50 ml. of N,N-dimethylformamide is stirred for one hour and then treated with a solution of 2.7 g. of 2-N,N-diethylaminoethyl chloride in 50 ml. of toluene. The reaction mixture is worked up as described in Example 7 to yield the 1-[4-(2 - N,N - diethylaminoethyl)-oxy-phenyl]1,2,3,4-tetrahydro-naphthalene of the formula

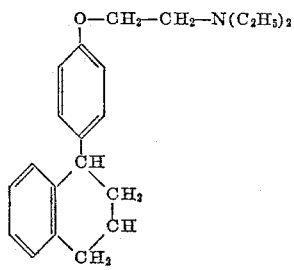

which is purified by distillation, B.P. 175–175°/0.3 mm.; yield: 5.63 g., and converted into its hydrochloride by treatment with hydrogen chloride in diethyl ether, M.P. 152–153° (after repeated recrystallization from a mixture of acetone and diethyl ether).

The starting material used in the above procedure is prepared as follows: To a mixture of 13.0 g. of aluminum chloride and 20.0 g. of phenol in 20 ml. of hexane is added dropwise a solution of 15.0 g. of 1,2,3,4-tetrahydro-naphthalen-1-ol in hexane while stirring and cooling with tap-water. After the hydrogen chloride evolution subsides, stirring is continued at room temperature for an additional two hours, and the reaction mixture is then poured into 100 ml. of an ice-cold 6 N aqueous hydrochloric acid and 50 ml. of hexane. The mixture is stirred and the crystalline material is filtered off and air-dried; yield: 23.5 g. The desired 1-(4-hydroxy-phenyl)-1,2,3,4-tetrahydro-naphthalene is purified by recrystallization from a 1:1-mixture of ethanol and water, M.P. 124–126°.

Example 11

A mixture of 1.8 g. of 1-(3-chloro-4-hydroxy-phenyl)-1,2,3,4-tetrahydro-naphthalene and 0.36 g. of a 53 percent suspension of sodium hydride in mineral oil, in 20 ml. of N,N-dimethylformamide is stirred for one hour and treated with a solution of 1.0 g. of 2-N,N-diethylaminoethyl chloride in 20 ml. of toluene. The reaction mixture is worked up as described in Example 7 and yields 2.1 g. of the oily 1-[3-chloro-4-(2-N,N-diethylaminoethyl)-oxy-phenyl]-1,2,3,4-tetrahydro-naphthalene of the formula

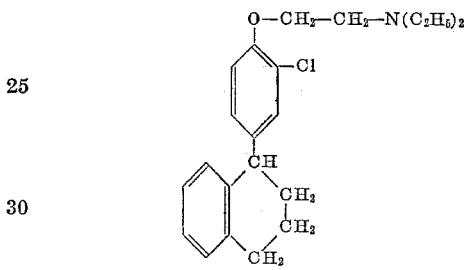

which is converted into its hydrochloride by treatment with a diethyl ether solution of hydrogen chloride; the 1-[3 - chloro - 4-(2-N,N-diethylaminoethyl)-oxy-phenyl]-1,2,3,4 - tetrahydro-naphthalene hydrochloride melts at 166–167° after recrystallization from a 5:1:10-mixture of acetone, ethanol and diethyl ether.

The starting material used in the above procedure may be prepared as follows: To a mixture of 13.0 g. of aluminum chloride and 30.0 g. of o-chloro-phenol in 25 ml. of hexane is added while stirring, 15.0 g. of 1,2,3,4-tetrahydro-naphthalene-1-ol in 10 ml. of hexane. The dark red reaction mixture is stirred at room temperature for two hours and then allowed to stand for fifteen hours. It is then added to 500 ml. of 6 N aqueous hydrochloric acid and 50 ml. of benzene and stirred until a homogenous suspension is obtained. The organic layer is separated, the aqueous solution is extracted three times with benzene, and the combined organic solutions are washed with saturated aqueous solutions of sodium hydrogen carbonate and of sodium chloride, dried over sodium sulfate and evaporated to dryness. The resulting dark oil is distilled, and 5.5 g. of the viscous yellow 1-(3-chloro-4-hydroxy-phenyl)-1,2,3,4-tetrahydro-naphthalene is collected, at 170–180°/0.3 mm., and purified by preparing the benzoate, M.P. 91–92°, according to the Schotten-Baumann method (treatment with benzoic acid chloride in the presence of an alkali metal hydroxide) and hydrolizing 2.3 g. of the resulting 1-(4-benzoyloxy-3-chloro-phenyl)-1,2,3,4-tetrahydro-naphthalene in 30 ml. of methanol by treatment with 0.5 g. of potassium hydroxide; 1.8 g. of the pure 1 - (3-chloro-4-hydroxy-phenyl)-1,2,3,4-tetrahydro-naphthalene is obtained.

Example 12

A mixture of 1-[4-(2-chloroethyl)-oxy-phenyl]-indane (as prepared according to the procedure described below) and 60.0 g. of N,N-diethylamine in 200 ml. of ethanol is refluxed for six hours. The solvent is evaporated, water is added to the residue, and the aqueous mixture is made basic with concentrated ammonium hydroxide. The organic material is extracted with diethyl ether; the organic solution is washed several times with water, dried and evaporated to yield the 1-[4,(2-N,N-diethylaminoethyl)- oxy-phenyl]-indane, which is converted into its hydrochloride, M.P. 133–135° (after recrystallization from n-propanol), by adding an ethanol solution of hydrogen chloride.

The starting material used in the above procedure is prepared as follows: A mixture of 100.0 g. of 1-(4-hydroxy-phenyl)-indane and 70.0 g. of 2-chloroethyl bromide in 500 ml. of acetone is refluxed for six hours in the presence of 100.0 g. of powdered anhydrous sodium carbonate. The solid material is filtered off, the filtrate is evaporated to dryness, and the residue is dissolved in diethyl ether. The organic solution is washed with a 10 percent aqueous solution of sodium hydroxide and evaporated to yield the desired 1[4-(2-chloroethyl)-oxyphenyl]-indane, which is used without further purification.

By substituting the 3-(4-hydroxy-phenyl)-indene for the 1-(4-hydroxy-phenyl)-indane, reacting it with 2-chloroethyl bromide in the presence of anhydrous sodium carbonate, and treating the resulting 3-[4-(2-chloroethyl)-oxy-phenyl]-indene with N,N-diethylamine according to the above procedure, the 3-[4-(2-N,N-diethylaminoethyl)-oxy-phenyl]-indene is obtained, which is converted into its hydrochloride, M.P. 168–171°, after recrystallization from a mixture of ethanol and diethyl ether.

*Example 13*

A solution of 3.5 g. of 3-(4-hydroxy-phenyl)-indene in xylene is added dropwise to a stirred suspension of 0.86 g. of sodium hydride in xylene, held at 70°; the reaction mixture is refluxed for two hours. After cooling, 2.9 g. of N,N-diethylaminoethyl chloride is added dropwise and refluxing is continued for sixteen hours. The xylene solution is washed with 15 percent aqueous hydrochloric acid; the acid solution is made basic with concentrated ammonium hydroxide and extracted with diethyl ether. The organic solution is washed, dried and evaporated, and the residue is distilled; the fraction boiling at 181–183°/0.35 mm., yield: 1.75 g., is collected and subjected to chromatography on 20 g. aluminum oxide. The resulting 3-[4-(2-N,N-diethylaminoethyl-oxy-phenyl]-indene of the formula

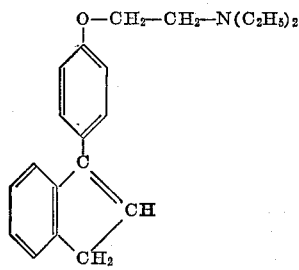

is converted into its hydroscopic hydrochloride, which melts at 168–171° after recrystallization from a mixture of ethanol and diethyl ether.

The starting material used in the above procedure is prepared as follows: To a Grignard reagent prepared from a solution of 198.0 g. of p-bromo-anisole in 500 ml. of diethyl ether and 25.2 g. of magnesium, is added a solution of 40.0 g. of indan-1-one in diethyl ether. The reaction mixture is refluxed for three hours and allowed to stand at room temperature overnight and is then decomposed by adding a saturated aqueous solution of ammonium chloride. The organic solution is decanted, the precipitate is washed several times with diethyl ether and the combined organic solutions are evaporated to dryness. The crude residue is refluxed with 250 ml. of concentrated hydrochloric acid for ninety minutes, diethyl ether is added and the organic layer is separated, washed, dried and evaporated. The residue is distilled to yield 18.0 g. of 3-(4-methoxy-phenyl)-indene, B.P. 163–170°/15 mm.

A mixture of 224 ml. of pyridine and 280 ml. of concentrated hydrochloric acid is distilled until the vapors reach a temperature of 200°, and 18.0 g. of the 3-(4-methoxy-phenyl)-indene is added to the remaining pyridine hydrochloride. The mixture is refluxed for thirty minutes, then cooled and poured into 800 ml. of water. The organic material is extracted with diethyl ether; the organic solution is washed several times with water and then with a 12 percent aqueous solution of sodium hydroxide. The aqueous solution is made acidic by adding hydrochloric acid of 15 percent strength and extracted with diethyl ether. The organic solution is washed, dried over magnesium sulfate and evaporated to dryness. The resulting 3-(4-hydroxy-phenyl)-indene is recrystallized from benzene, M.P. 106–109°.

*Example 14*

A mixture of 10.0 g. of 1-[4-(2-N,N-diethylaminoethyl)-oxy-phenyl]indan-1-ol and 0.5 g. of a palladium catalyst (10 percent palladium on charcoal) in 50 ml. of ethanol is treated with hydrogen at a pressure of 2.15 atmospheres and at a temperature of 70°. After one molar equivalent of hydrogen has been absorbed, the catalyst is filtered off and the ethanol is evaporated to yield the 1-[4-(2-N,N-diethylaminoethyl)-oxy-phenyl]-indane, which is converted into its hydrochloride, M.P. 130–133° after recrystallization from a mixture of ethanol and diethyl ether.

The starting material used in the above procedure is prepared as follows: The Grignard reagent from 50.0 g. of [4-(2-N,N - diethylaminoethyl) - oxy] - bromobenzene and 6.0 g. of magnesium in 200 ml. of tetrahydrofuran is prepared according to the usually employed method. To the resulting reagent is added dropwise a solution of 24.0 g. of indan-1-one in 100 ml. of diethyl ether. After refluxing for two hours, the reaction mixture is decomposed by adding 50 ml. of a saturated aqueous solution of ammonium chloride to the cooled mixture. The inorganic precipitate is separated by decanting the solvent and is washed several times with diethyl ether; the combined organic solutions are evaporated to a small volume and the residue is dissolved in diethyl ether. The latter solution is extracted with 10 percent aqueous hydrochloric acid, the acid extract is made basic with ammonia, and the desired 1-[4-(2-N,N-diethylaminoethyl)-oxy-phenyl]-indan-1-ol is extracted with diethyl ether, isolated by distilling off the diethyl ether; the free base is used without further purification.

*Example 15*

To a solution of 10.0 g. of 1-[4-(2-N,N-diethylaminoethyl)-oxy-phenyl]-indan-1-ol in 100 ml. of toluene is added 0.2 g. of p-toluene sulfonic acid; the reaction mixture is refluxed, and the resulting water is separated in a Dean-Stark water trap. After two hours, the evolution of water ceases, and gaseous hydrogen chloride is passed through the solution to precipitate the 3-[4-(2-N,N - diethylaminoethyl)-oxy-phenyl]-indene hydrochloride, which melts at 168–171° after recrystallization from a mixture of ethanol and diethyl ether.

Other compounds, which may be prepared according to the above-described method are, for example, 1-[3-chloro-4-(2-N,N-diethylamino-2-methyl-ethyl)-oxy-phenyl]-indane,
1-{3-bromo-4-[2-(4-methyl-1-piperazino)-ethyl]-oxyphenyl}-indane,
5-chloro-1-[4-(2-N,N-diethylaminoethyl)-oxy-phenyl]-indane,
6-chloro-1-{4-[2-(1-pyrrolidino)-ethyl]-oxy-phenyl}-indane,
5-methyl-1-{3-[3-(4-morpholino)-propyl]-oxy-phenyl}-indane,
2-[4-(2-N,N-dimethylaminoethyl)-oxy-phenyl]-5-methoxy-indane,
3-[4-(2-N,N-dimethylaminoethyl)-oxy-phenyl]-indene,
3-[3-chloro-4-(2-N,N-diethylaminoethyl)-oxy-phenyl]-indene, 1-[4-(2-N,N-diethylaminoethyl)-oxy-phenyl]-6-methyl-1,2,3,4-tetrahydro-naphthalene,
6-chloro-1-{4-[2-(1-piperidino)-ethyl]-oxy-phenyl}-1,2,3,4-tetrahydro-naphthalene,
8-chloro-2-{4-[2-(4-morpholino)-ethyl]-oxy-phenyl}-1,2,3,4-tetrahydro-naphthalene,
1-[3-chloro-5-(2-N,N-diethylaminoethyl)-oxy-phenyl]-1,2,3,4-tetrahydro-naphthalene,
2-[4-(2-N,N-diethylaminoethyl)-oxy-phenyl]-1,2,3,4-tetrahydro-naphthalene,
1-[4-(2-N,N-diethylaminoethyl)-oxy-phenyl)-3,4-dihydro-naphthalene,
8-chloro-{4-[2-(4-morpholino)-ethyl]-oxy-phenyl}-3,4-dihydro-naphthalene,
6-methyl-2-{4-[2-(1-pyrrolidino)-ethyl]-oxy-phenyl}-3,4-dihydro-naphthalene,
1-[4-(2-N,N-diethylaminoethyl)-oxy-phenyl]-benzosuberan and the like.

These compounds may be converted into their acid addition salts, e.g. hydrochlorides, hydrobromides, maleates and the like, according to the previously described procedure. The lower alkyl quaternary ammonium halides, such as the methochlorides, methiodides and the like, of these compounds may be prepared, for example, by reacting the free compounds with an excess of a lower alkyl halide, e.g. methyl iodide and the like, if necessary, in a closed vessel and/or at an elevated temperature. The N-oxides, which may be obtained by treatment with a suitable organic percarboxylic acid, e.g. perbenzoic acid and the like, in an inert solvent, especially a halogenated hydrocarbon, may be converted into their acid addition salt according to the procedure described above.

*Example 16*

The compounds of this invention may be used in the form of compositions for enteral, parenteral or topical use, which contain the new compounds in admixture with a suitable pharmaceutical organic or inorganic, solid or liquid carrier. For making up the preparations there can be employed carriers which do not react with the new compounds, such as water, gelatine, lactose, starches, stearic acid, magnesium stearate, sodium lauryl sulfate, talc, tragacanth, vegetable oils, alcohol, benzyl alcohol, cetyl alcohol, petrolatum, gums, propylene glycol, polyalkylene glycols or any other carrier used for pharmaceutical preparations. The latter may be in solid form, for example, as capsules, tablets, dragees and the like, in liquid form, for example, as solutions, suspensions and the like, or as emulsions, such as creams, ointments and the like. If necessary, these preparations may contain auxiliary substances, such as preserving, stabilizing, wetting, emulsifying, coloring, flavoring agents and the like, salts for varying the osmotic pressure, buffers, etc., and may also contain, in combination, other useful substances.

Thus, the compounds of this invention, having one of the previously given formulae and being useful in the treatment of superficial dermatophytoses, may be applied in the form of pharmaceutical compositions for topical use, containing from about 0.1 percent to about 10 percent, especially from about 0.5 percent to about 5 percent, of the active ingredient, particularly of a compound having one of the following formulae:

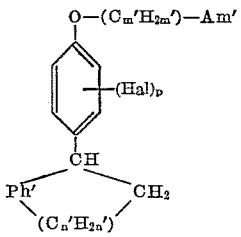

and

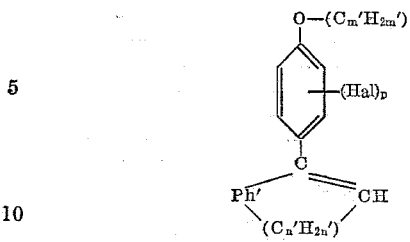

in which Ph', Am', Hal, the letter p and the groups of the formulae —($C_n'H_{2n'}$)— and —($C_m'H_{2m'}$)— have the previously given meaning, respectively, or an acid addition, particularly a pharmaceutically acceptable acid addition, salt thereof. The compositions may be formulated according to known methods used in the art of manufacturing pharmaceutical preparations.

For example, an ointment containing 1 percent of 1 - [3 - chloro-4 - (2 - N,N-diethylaminoethyl) - oxy - phenyl]-indane hydrochloride as the active ingredient is prepared as follows (for 100.0 g.):

| Ingredients: | G. |
|---|---|
| 1-[3-chloro-4-(2-N,N-diethylaminoethyl)-oxy-phenyl]-indane hydrochloride | 1.0 |
| Liquid petrolatum | 5.0 |
| White petrolatum | 94.0 |

The 1 - [3 - chloro - 4 - (2 - N,N - diethylaminoethyl)-oxy-phenyl]-indane hydrochloride is mixed with the liquid petrolatum by using a mortar until an adequate reduction in particle size is accomplished. The white petrolatum is then slowly blended with this mixture the ointment is passed through a three roller mill, until total uniformity is obtained and filled into epoxy lined tubes (5 g.).

A cream, containing 1 percent of 1-[3-chloro-4-(2-N,N-diethylaminoethyl)-oxy-phenyl]-indane hydrochloride as the active ingredient is prepared as follows (for 100.0 g.):

| Ingredients: | G. |
|---|---|
| 1-[3-chloro-4-(2-N,N-diethylaminoethyl)-oxy-phenyl]-indane hydrochloride | 1.0 |
| Propylene glycol | 15.0 |
| Sodium lauryl sulfate | 2.0 |
| Cetyl alcohol | 15.0 |
| Phenyl mercuric acetate | 0.002 |
| Purified water q.s. | 100.0 |

The phenylmercuric acetate is dissolved in 65 ml. of water at 90°; subsequently the sodium lauryl sulfate is added and the temperature is reduced to 70°. The cetyl alcohol is melted at 70° and added to the aqueous solution while vigorously agitating. Stirring is continued while cooling the mixture to 45°.

The 1 - [3 - chloro - 4-(2-N,N-diethylaminoethyl)oxy-phenyl]-indane hydrochloride is dispersed in the propylene glycol at 45° and added to the above emulsion while agitating. Sufficient water is added to bring the weight to 100 g., and mixing is continued while the product cools to room temperature. The cream is passed through a three roller mill until total uniformity is accomplished and is filled into epoxy lined tubes (5 g.).

A cream containing 2 percent of 1-[3-chloro-4-(2-N,N-diethylaminoethyl)-oxy-phenyl]-indane hydrochloride as the active ingredient is prepared as follows (for 3000.0 g.):

| Ingredients: | G. |
|---|---|
| 1 - [3-chloro-4-(2-N,N-diethylaminoethyl)-oxy-phenyl]-indane hydrochloride | 60.0 |
| Glyceryl monostearate | 225.0 |
| Lanolin, anhydrous | 30.0 |
| Isopropyl myristate | 90.0 |
| Polyethylene glycol 4000 monostearate | 300.0 |

| | |
|---|---|
| Stearic acid | 390.0 |
| Sorbitan sesquioleate | 15.0 |
| Spermaceti | 180.0 |
| Propylene glycol | 150.0 |
| Polysorbate 60 | 45.0 |
| Purified water | 1515.0 |

The glyceryl monostearate, the lanolin, the isopropyl myristate, the polyethylene glycol 4000 monostearate, the stearic acid, the sorbitan sesquioleate, and the spermaceti are melted together at 80° on the water bath. The water containing the polysorbate 60 is added while stirring at 80°; stirring is continued until the temperature drops below 40°. The solution of the 1-[3-chloro-4-(2-N,N-diethylaminoethyl)-oxy-phenyl]-indane hydrochloride in propylene glycol is added; stirring is continued and water is added to bring the weight to 3000.0 g. The cream is passed through a homogenizer and filled into tubes.

*Example 17*

A solution of 0.5 g. of 1-[3-chloro-4-(2-N,N-diethylaminoethyl)-oxy-phenyl]-indane in 10 ml. of acetone is treated with a ten percent excess of methyl iodide. The reaction mixture is treated with ethyl acetate, and the oily material crystallizes after standing for 48 hours. The 1 - [3 - chloro - 4 - (2 - N,N-diethylaminoethyl) - oxy-phenyl]-indane methiodide is filtered off and recrystallized from a mixture of acetone and ethyl acetate, M.P. 105–108°.

*Example 18*

To a solution of 0.00361 mole of 1-[3-chloro-4-(2-N,N-diethylaminoethyl)-oxy-phenyl]-indane in 10 ml. of methanol is slowly added 2.5 ml. of a 30 percent hydrogen peroxide solution while stirring. The reaction mixture is allowed to stand at room temperature for 2½ days, after which the excess of peroxide is reduced by adding a platinum hydrogenation catalyst (5 percent platinum on charcoal). The methanol is evaporated, the oily 1-[3-chloro - 4 - (2 - N,N - diethylaminoethyl) - oxy - phenyl]-indane N-oxide is dissolved in ethanol and an equivalent amount of picric acid is added to form the crystalline 1 - [3 - chloro - 4 - (2 - N,N - diethylaminoethyl) - oxy-phenyl]-indane N-oxide picrate, which melts at 144–146° after recrystallization from ethanol.

What is claimed is:
1. A compound having the formula

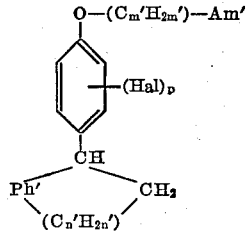

in which Ph' stands for a member selected from the group consisting of 1,2-phenylene, (lower alkyl)-1,2-phenylene, (lower alkoxy)-1,2-phenylene, (halogeno)-1,2-phenylene, (nitro)-1,2-phenylene, (N,N-di-lower alkyl-amino)-1,2-phenylene and (trifluoromethyl)-1,2-phenylene, the group of the formula —($C_n'H_{2n'}$)— stands for unbranched lower alkylene, Am' is a member selected from the group consisting of N,N-di-lower alkyl-amino, N,N-(X-alkylene)-imino, in which alkylene has from four to seven carbon atoms and X is a member selected from the group consisting of hydrogen, lower alkyl, hydroxy and lower alkanoyloxy, 4-morpholino and 4-lower alkyl-1-piperazino, the group of the formula —($C_m'H_{2m'}$)— stands for alkylene having from two to three carbon atoms and separating the group Am' from the oxygen atom by two to three carbon atoms, Hal is halogeno, and the letter p stands for one of the integers selected from the group consisting of 0, 1 and 2.

2. An acid addition salt of a compound having the formula

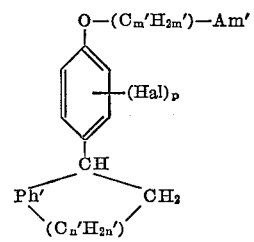

in which Ph' stands for a member selected from the group consisting of 1,2-phenylene, (lower alkyl)-1,2-phenylene, (lower alkoxy)-1,2-phenylene, (halogeno)-1,2-phenylene, (nitro)-1,2-phenylene, (N,N-di-lower alkyl-amino)-1,2-phenylene and (trifluoromethyl)-1,2-phenylene, the group of the formula —($C_n'H_{2n'}$)— stands for unbranched lower alkylene, Am' is a member selected from the group consisting of N,N-di-lower alkyl-amino, N,N-(X-alkylene)-imino, in which alkylene has from four to seven carbon atoms and X is a member selected from the group consisting of hydrogen, lower alkyl, hydroxy and lower alkanoyloxy, 4-morpholino and 4-lower alkyl-1-piperazino, the group of the formula —($C_m'H_{2m'}$)— stands for alkylene having from two to three carbon atoms and separating the group Am' from the oxygen atom by two to three carbon atoms, Hal is halogeno, and the letter p stands for one of the integers selected from the group consisting of 0, 1 and 2.

3. 1 - [3 - chloro - 4 - (2-N,N-diethylaminoethyl)-oxy-phenyl]-indane.

4. An acid addition salt of 1-[3-chloro-4-(N,N-diethylaminoethyl)-oxy-phenyl]-indane.

5. 1 - [3 - chloro - 4 - (2-N,N-diethylaminoethyl)-oxy-phenyl]-indane hydrochloride.

6. 1 - [4 - (2 - N,N - diethylaminoethyl) - oxy-phenyl]-indane.

7. 1 - [3,5 - dichloro - 4 - (2-N,N-diethylaminoethyl)-oxy-phenyl]-indane.

8. 1 - [4 - (2 - N,N - diethylaminoethyl)-oxy-phenyl]-1,2,3,4-tetrahydro-naphthalene.

9. 1 - [3 - chloro - 4 - (2-N,N-diethylaminoethyl)-oxy-phenyl]-1,2,3,4-tetrahydro-naphthalene 10. A compound of the formula

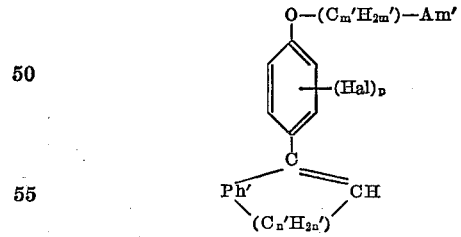

in which Ph' stands for a member selected from the group consisting of 1,2-phenylene, (lower alkyl)-1,2-phenylene, (lower alkoxy)-1,2-phenylene, (halogeno)-1,2-phenylene, (nitro)-1,2-phenylene, (N,N-di-lower alkyl-amino)-1,2-phenylene and (trifluoromethyl)-1,2-phenylene, the group of the formula —($C_n'H_{2n'}$)— stands for unbranched lower alkylene, Am' is a member selected from the group consisting of N,N-di-lower alkyl-amino, N,N-(X-alkylene)-imino, in which alkylene has from four to seven carbon atoms and X is a member selected from the group consisting of hydrogen, lower alkyl, hydroxy and lower alkanoyloxy, 4-morpholino and 4-lower alkyl-1-piperazino, the group of the formula —($C_m'H_{2m'}$)— stands for alkylene having from two to three carbon atoms and separating the group Am' from the oxygen atom by two to three carbon atoms, Hal is halogeno, and the letter p stands for one of the integers selected from the group consisting of 0, 1 and 2.

11. An acid addition salt of a compound of the formula

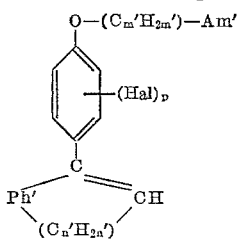

in which Ph' stands for a member selected from the group consisting of 1,3-phenylene, (lower alkyl)-1,2-phenylene, (lower alkoxy)-1,2-phenylene, (halogeno)-1,2-phenylene, (nitro)-1,2-phenylene, (N,N-di-lower alkyl-amino)-1,2-phenylene and (trifluoromethyl)-1,2-phenylene, the group of the formula —$(C_n'H_{2n'})$— stands for unbranched lower alkylene, Am' is a member selected from the group consisting of N,N-di-lower alkyl-amino, N,N-(X-alkylene)-imino, in which alkylene has from four to seven carbon atoms and X is a member selected from the group consisting of hydrogen, lower alkyl, hydroxy and lower alkanoyloxy, 4-morpholino and 4-lower alkyl-1-piperazino, the group of the formula —$(C_m'H_{2m'})$— stands for alkylene having from two to three carbon atoms and separating the group Am' from the oxygen atom by two to three carbon atoms, Hal is halogeno, and the letter p stands for one of the integers selected from the group consisting of 0, 1 and 2.

12. 3 - [4 - (2 - N,N-diethylaminoethyl)-oxy-phenyl]-indene.

13. A member selected from the group consisting of a compound having one of the formulae selected from the group consisting of

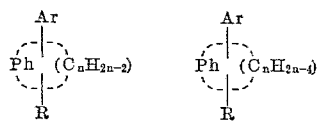

in which Ph is a member selected from the group consisting of 1,2-phenylene (lower alkyl)-1,2-phenylene, (hydroxy) - 1,2-phenylene, (lower alkoxy)-1,2-phenylene, (lower alkenyloxy)-1,2-phenylene, (lower alkylenedioxy)-1,2-phenylene, (halogeno)-1,2-phenylene, (nitro)-1,2-phenylene, (amino)-1,2-phenylene, (N,N-di-lower alkyl-amino) - 1,2-phenylene, (trifluoromethyl)-1,2-phenylene, (lower alkanoyl)-1,2-phenylene, (benzoyl)-1,2-phenylene, and (pyridoyl)-1,2-phenylene, Ar is a monocyclic carbocyclic aryl group of the formula

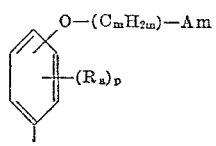

in which the group of the formula —$(C_mH_{2m})$— stands for lower alkylene having from 2 to 7 carbon atoms, and separates the group Am from the oxygen atom by at least 2 carbon atoms, Am is a tertiary amino group selected from the group consisting of N,N-di-lower alkyl-amino, N-cycloalkyl-N-lower alkyl-amino, in which cycloalkyl has from five to six ring carbon atoms, N-lower alkyl-N-phenyl-lower alkyl-amino, N-hydroxy-lower alkyl-N-lower alkyl-amino, in which hydroxy is separated from amino by two to three carbon atoms, N,N-di-hydroxy-lower alkyl-amino, in which hydroxy is separated from amino by two to three carbon atoms, 1-N,N-(X-alkylene)-imino, in which alkylene has from four to eight carbon atoms and X is a member selected from the group consisting of hydrogen, lower alkyl, hydroxy and lower alkanoyloxy, 4-X-1-N,N-(N-lower alkyl-aza-alkylene)-imino, in which alkylene has from four to six carbon atoms and X is a member selected from the group consisting of hydrogen, lower alkyl, hydroxy-lower alkyl and lower alkanoyloxy-lower alkyl, 4-morpholino and 4-thiamorpholino, $R_a$ is a member selected from the group consisting of hydrogen, halogeno, lower alkyl, halogeno-lower alkyl, and —O—$(C_mH_{2m})$—Am, in which Am and the group of the formula —$(C_mH_{2m})$— have the previously-given meaning, and the letter p stands for one of the integers selected from the group consisting of 0, 1 and 2, R is a member selected from the group consisting of hydrogen and lower alkyl, the group of the formula —$(C_nH_{2n-2})$— stands for an unbranched alkylene radical having from three to five carbon atoms and carrying the groups Ar and R, and the group of the formula —$(C_nH_{2n-4})$— stands for an unbranched alkenylene radical having from three to five carbon atoms and carrying the groups Ar and R, acid addition salts thereof, N-oxides thereof, acid addition salts of N-oxides thereof, lower alkyl quaternary ammonium compounds thereof, and phenyl-lower alkyl quaternary ammonium compounds thereof.

References Cited by the Examiner
UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,362,614 | 11/1944 | Calva | 167—22 |
| 2,763,687 | 9/1956 | Kerwin et al. | 260—570.7 |
| 2,774,766 | 12/1956 | Goldberg et al. | 260—294.7 |
| 2,833,775 | 5/1958 | Sperber et al. | 260—294.7 |
| 2,967,201 | 1/1961 | Soper | 260—570.7 |
| 2,975,098 | 3/1961 | Driver et al. | 167—58 |
| 2,980,583 | 4/1961 | Tanner | 167—58 |

NICHOLAS S. RIZZO, *Primary Examiner.*

IRVING MARCUS, *Examiner.*